United States Patent Office 3,397,953
Patented Aug. 20, 1968

3,397,953
FLOCCULATING AGENT
Thomas J. Galvin and Francis A. Hughes, Wilmington, Del., assignors to Atlas Chemical Industries, Inc., Wilmington, Del., a corporation of Delaware
No Drawing. Filed Mar. 4, 1965, Ser. No. 437,309
3 Claims. (Cl. 23—143)

ABSTRACT OF THE DISCLOSURE

Compositions comprising starch and polyacrylic acid as flocculating agents, particularly for the flocculation and sedimentation of iron oxide suspension.

---

This invention relates to starch and a polyacrylic acid and to the process of using such products to facilitate the flocculation and sedimentation of insoluble materials from liquid media containing dispersions of finely suspended particles. More particularly, this invention is concerned with compositions comprising starch and a polyacrylic acid that are useful in bringing about separation and sedimentation of many types of suspended solids in liquid media so that the liquid phase may be further clarified.

The compositions of this invention have been discovered to possess particularly excellent properties as flocculating agents for systems containing iron oxides. In general, these flocculating agents have been found to be useful in the purification of water for industrial purposes and in the processing of ores. Compositions of this invention have been found to be particularly useful in the bauxite refining process. In the bauxite process the subject compositions have been found to be very effective in flocculating the "red mud" from sodium aluminate solutions in the process involved in recovering aluminum oxide from bauxite slurries. "Red mud" is known to consist chiefly of iron oxides.

In the manufacture of aluminum the raw bauxite is first treated with an excess of hot caustic solution in a digestion apparatus. The caustic reacts with the alumina hydrates to form sodium aluminate which is soluble in the alkaline solution. However, the caustic is without effect on the iron oxides that make up from 10 to 30% of the bauxite ore and these remain in the digestion liquor as a very finely divided suspension. Historically, the insoluble iron oxides are generally separated from the sodium aluminate liquor by introducing starch into the bauxite slurry which causes the insoluble iron oxides to flocculate and settle, leaving a clear sodium aluminate solution at the top of the mixture. In industrial operations, the clear sodium aluminate liquor is decanted, filtered and further processed while the flocculated "red mud," consisting essentially of iron oxides, is washed to recover mother liquor and the "red mud" is discarded.

It has been the custom in the industry to use a starch such as corn starch to bring about the flocculation of iron oxides. However, the use of starch as flocculating agent is generally considered not to be completely satisfactory. Relatively large quantities of starch are required and, in general, they take a relatively long time to effect the desired separation. Additionally, with the use of starch organic impurities are introduced into the mother or spent liquor which is re-used in the continuous alumina recovery process.

In accordance with this invention a greatly superior flocculation composition and procedure are provided in which a starch and a polyacrylic acid are employed as a flocculating agent. Though the use of such compositions, it is possible to obtain faster settling rates employing no more than ⅓ as much settling aid as used in the past. In the preferred embodiment of the present invention a blend of starch and a polyacrylic acid is used to obtain the desired results. Among the starch products that may be used in the present compositions are corn starch, tapioca starch, potato starch, amylose and sorghum. The polyacrylic acid component may suitably be polyacrylic acid itself or polymethacrylic acid. Numerous polyacrylic acid products are suitable. Among those available are Acrysol A–1, Acrysol A–3 and Acrysol A–5 manufactured and sold by The Rohm and Haas Co., Washington Square, Pa.

These products are 25% aqueous solutions of polyacrylic acid and vary as to viscosity and molecular weight. The polyacrylic acid in Acrysol A–1, Acrysol A–3 and acrysol A–5 has a molecular weight of less than 50,000, less than 150,000 and less than 300,000 respectively. The approximate viscosity of Acrysol A–1, Acrysol A–3 and Acrysol A–5 at 77° F. is 320 centipoises, 3000 centipoises and 18,000 centipoises respectively. In general, it has been found that polyacrylic acid and polymethacrylic acid having a molecular weight in the range of from about 5,000 to about 500,000 are suitable for use in the subject compositions.

The invention will be described in more detail with respect to the flocculation of "red mud" from Jamaican bauxite which is known in the industry to process with difficulty and which usually requires about 11 lbs. of starch per 2.3 tons of bauxite processed to obtain a satisfactory rate of flocculation.

The compositions of this invention desirably contain a sufficient quantity of a polyacrylic acid to substantially lower the amount of starch which is necessary to obtain the desired degree of flocculation. On the other hand a polyacrylic acid alone is not suitable as a flocculating agent and the desirable content of the polyacrylic component in the subject compositions is limited by functional as well as economic reasons. In general it has been found that on a dry weight basis excellent flocculating results are obtained when compositions containing from as little as 2.65 to as much as 196 parts by weight of starch per part of polyacrylic component are used although it is usually preferred that the proportions by weight of starch to one part of polyacrylic component lie within the ranges of from about 7 to about 76 parts.

Compositions within these ranges can be prepared by simple mixing of the readily available 25% aqueous solutions of polyacrylic acid with starch. Such compositions contain from about 2 to about 60% of a 25% solution of polyacrylic acid and from about 40 to about 98% of starch. However, in most instances compositions containing from about 5 to about 35 percent of a 25% aqueous polyacrylic acid solution and from about 65 to about 95 percent starch are recommended in view of optimum rate of flocculation results obtained and low cost of product.

The polyacrylic acid or polymethacrylic acid component may also be used in the dry form to prepare the subject blends.

The amount of starch-polyacrylic composition of this invention to be used would be that necessary to produce the desired degree of flocculation and this will usually be found between the boundary of about ½ pound and about 7 pounds on a dry basis per 2.3 tons of bauxite in slurry. Quantities less than ½ pound and greater than 7 pounds per 2.3 tons bauxite may be used depending on the type of bauxite being processed and the relative difficulty of flocculating the "red mud." However, in most instances when less than about ½ pound and more than about 7 pounds of the subject compositions on a dry basis per 2.3 tons of bauxite are used reduced flocculation rates are obtained.

The blends of polyacrylic acid or polymethacrylic acid and starch may be prepared by mixing the components in any type of mixer suitable for blending dry materials. For example, the Baker Perkins Universal Mixer, manufactured and sold by Baker Perkins, Inc., Saginaw, Mich., is suitable for this purpose.

It is also within the scope of this invention to add the polyacrylic acid product and starch separately and consecutively to the dispersion to be flocculated. In accordance with this embodiment of the subject invention either the starch or the polyacrylic acid product may be added first followed by the addition of the other product.

The data set forth in the following tables are presented point, the digested slurries were treated with the indicated settling aid.

The settling aid was added in the form of solution consisting of 3% settling aid in 5% aqueous sodium hydroxide solution.

After addition of the settling aid the bauxite slurry was stirred approximately 20 seconds by hand and kept at 94° C. by immersion in an oil bath. The treated slurry was gently agitated with a mechanical type paddle stirrer at 10 r.p.m. while visually recording the settling rate in mls.

TABLE I

| Settling Aids | 5% Blend [1] | | 10% Blend [2] | | 25% Blend [3] | | 35% Blend [4] | | 50% Blend [5] | | Acrysol A-1 | | Corn Starch | | Potato Starch | |
|---|---|---|---|---|---|---|---|---|---|---|---|---|---|---|---|---|
| Pounds settling aid per 2.3 tons bauxite | 5 | 3 | 5 | 3 | 5 | 3 | 5 | 3 | 5 | 3 | 5 | 11 | 5 | 11 | 8 | 5 | 3 |

| | Ml. Separation |
|---|---|

| Time (seconds): | | | | | | | | | | | | | | | | | |
|---|---|---|---|---|---|---|---|---|---|---|---|---|---|---|---|---|---|
| 20 | 12 | 2 | 6 | 2 | 6 | 0 | 4 | 2 | 4 | 4 | 0 | 3 | 2 | 14 | 5 | 1 | 2 |
| 40 | 22 | 4 | 8 | 4 | 14 | 2 | 11 | 2 | 12 | 6 | 0 | 6 | 6 | 34 | 14 | 6 | 4 |
| 60 | 35 | 4 | 14 | 6 | 32 | 4 | 19 | 5 | 24 | 6 | 0 | 13 | 10 | 74 | 26 | 12 | 4 |
| 100 | 70 | 8 | 50 | 16 | 80 | 16 | 63 | 10 | 64 | 15 | 0 | 32 | 20 | 115 | 43 | 26 | 12 |
| 200 | 102 | 36 | 110 | 44 | 135 | 62 | 122 | 44 | 112 | 42 | 0 | 82 | 60 | 136 | 84 | 58 | 38 |
| 300 | 140 | 56 | 134 | 60 | 140 | 82 | 149 | 69 | 136 | 60 | 0 | 104 | 82 | 141 | 110 | 79 | 58 |
| 400 | 145 | 70 | 140 | 74 | 150 | 94 | 157 | 87 | 144 | 80 | 0 | 116 | 100 | 143 | 123 | 90 | 70 |
| 500 | 150 | 80 | 146 | 84 | 155 | 104 | 162 | 97 | 152 | 86 | 0 | 122 | 108 | 145 | 131 | 99 | 80 |
| 600 | 152 | 86 | 150 | 90 | 155 | 112 | 162 | 107 | 156 | 95 | 0 | 124 | 116 | 145 | 136 | 106 | 88 |

[1] Blend of 5% Acrysol A-1, 95% Potato Starch.
[2] Blend of 10% Acrysol A-1, 90% Potato Starch.
[3] Blend of 25% Acrysol A-1, 75% Potato Starch.
[4] Blend of 35% Acrysol A-1, 65% Potato Starch.
[5] Blend of 50% Acrysol A-1, 50% Potato Starch.

TABLE II

| | Pounds of Blended Agent Added per 2.3 Tons Bauxite | | | | | | |
|---|---|---|---|---|---|---|---|
| | Varying Type of Starch | | | | Acrylic Polymer | | |
| Potato Starch | 2.5 | | | | 2.5 | 2.5 | 2.5 |
| Corn Starch | | 2.5 | | | | | |
| Amylose | | | 2.5 | | | | |
| Sorghum | | | | 2.5 | | | |
| Acrysol A-1 | | | | | 0.25 | | |
| Acrysol A-3 | 2.5 | 2.5 | 2.5 | 2.5 | | 0.25 | |
| Acrysol A-5 | | | | | | | 0.25 |
| Percent Acrysol in Blend ([1]) | 50 | 50 | 50 | 50 | 9 | 9 | 9 |

| Time (seconds): | | | Ml. Separation | | | | |
|---|---|---|---|---|---|---|---|
| 20 | 4 | 8 | 4 | 4 | 8 | 16 | 8 |
| 40 | 12 | 24 | 8 | 8 | 32 | 40 | 24 |
| 60 | 24 | 40 | 12 | 20 | 52 | 60 | 40 |
| 100 | 64 | 116 | 24 | 36 | 80 | 100 | 76 |
| 200 | 112 | 120 | 44 | 80 | 124 | 136 | 120 |
| 300 | 136 | 138 | 96 | 92 | 140 | 148 | 132 |
| 400 | 144 | 148 | 104 | 100 | 148 | 152 | 140 |
| 500 | 152 | 152 | 112 | 112 | 152 | 156 | 144 |
| 600 | 156 | 156 | 120 | 116 | 156 | 156 | 148 |

[1] Components were added to bauxite slurry as a blend of weights indicated.

to enable a clear understanding of the subject invention. However, it will be understood that the said tables are given only by way of illustration and are not to be considered limitative of the scope of the present invention.

The procedure utilized in obtaining the data was followed in order to simulate the continuous deflocculation process used in the industry.

19 grams of finely ground Jamaican bauxite along with 0.12 gram of calcium oxide to tie up silicates present was added to 152 mls. of spent liquor which was prepared according to the following formula:

| | |
|---|---|
| NaOH | grams__ 169.8 |
| $Na_2CO_3$ | do____ 39.7 |
| $Na_2SiO_3 \cdot 9H_2O$ | do____ 1.89 |
| $Al_2O_3 \cdot 3H_2O$ | do____ 102.4 |
| Distilled water to make | ml__ 1000 |

Heat and stir until uniform.

The slurry was then poured into a 300 ml. pressure bomb and pressurized with nitrogen to about 180 p.s.i.g. The contents of the bomb were flushed into an autoclave and the autoclave temperature was rapidly brought to 200° C. and kept at this temperature (±5° C.) for 30 minutes. The temperatures employed in the digestion were high enough to bring the pressure to 250 p.s.i.g. (±10 p.s.i.).

At the end of the 30 minute digestion period, the slurry was flushed at full pressure into a four liter stainless steel pail and then into a graduated 250 ml. cylinder and brought to the 200 ml. mark with boiling water. At this

Example I

Bauxite is weighed into a pug mixer at the rate of approximately 70 tons per hour. The bauxite is mixed with spent liquor (formula noted above), to prepare a 50% slurry. As the slurry is pumped from the pug mixer more spent liquor is added to further reduce the concentration of bauxite in the slurry to about 15 percent. Then this material is pumped to a series of high pressure steam digesters. The bauxite slurry is digested at about 200° C. at approximately 250 p.s.i.g. in a sodium hydroxide concentration of approximately 200 grams per liter in a series of three digesters. After a digestion cycle of about 30 minutes the slurry is flashed to a blow-off tank to drop the pressure to atmospheric pressure, reduced to 3–5% solids by adding spent liquor and then through a sand trap and into a mud settler. Just before going into the mud settler an amount equivalent to about 3 pounds per 2.3 tons of bauxite of a 35% blend of Acrysol A-1 and 65% corn starch is added to the slurry. The Acrysol-starch blend is added to the bauxite slurry in the form of a dispersion comprising 3% of the subject blend in 5% aqueous sodium hydroxide solution. Four hundred gallons of this dispersion is necessary to bring about the desired flocculation of the 70 tons of bauxite ore.

After the "red mud" settles the clear sodium aluminate solution is pumped from the top of the settling tank and the "red mud" is withdrawn from the bottom of the tank. The soluble sodium aluminate is concentrated and then seeded with alumina trihydrate crystals to affect the crystallization of pure alumina ($Al_2O_3 \cdot 3H_2O$).

A solution of polymethacrylic acid having a viscosity approximately equal to Acrysol A–1 could be substituted for the polyacrylic acid component in Example I and equivalent flocculation results obtained.

What is claimed:

1. In a process of recovering alumina from bauxite ore which include a digestion of the ore in caustic liquor to extract the alumina values and a subsequent clarification step to remove the caustic-insoluble ore materials which remain suspended in the resulting caustic aluminate liquor, the improvement in removing the said insoluble ore material from the liquor which comprises adding to said liquor from about 0.5 to about 7.0 pounds, per 2.3 tons of bauxite ore digested in its preparation, of a flocculating agent consisting essentially of starch and polyacrylic acid in a proportion of from 2.65 to 196 parts by weight of starch per part of polyacrylic acid.

2. The process of claim 1 wherein the said proportion is from about 7 to about 76 parts by weight per part of polyacrylic acid.

3. The process of claim 1 wherein the starch is selected from the group consisting of amylose, sorghum, potato and corn starch.

References Cited

UNITED STATES PATENTS

| 2,718,497 | 9/1955 | Oldham et al. | 210—54 |
| 2,935,377 | 5/1960 | Jones | 23—143 |
| 3,142,637 | 7/1964 | Cook | 23—143 X |
| 3,157,595 | 11/1964 | Johnson et al. | 210—54 |

FOREIGN PATENTS

| 580,658 | 8/1959 | Canada. |

REUBEN FRIEDMAN, *Primary Examiner.*

J. ADEE, *Assistant Examiner.*